United States Patent [19]

Fallon et al.

[11] Patent Number: 5,541,823
[45] Date of Patent: Jul. 30, 1996

[54] HOUSING ASSEMBLY FOR ILLUMINATED GLASS TUBING

[75] Inventors: Timothy R. Fallon, Columbia; Walter K. Tanner, Jr., Chesnee, both of S.C.

[73] Assignee: Fallon Luminous Products Corp., Spartanburg, S.C.

[21] Appl. No.: 389,314

[22] Filed: Feb. 16, 1995

[51] Int. Cl.$^6$ ............................................. F21S 3/00
[52] U.S. Cl. ........................... 362/219; 362/222; 362/263; 362/223
[58] Field of Search ....................... 362/217, 219, 362/222, 223, 224, 225, 260, 267, 375, 263

[56] References Cited

U.S. PATENT DOCUMENTS

| | | |
|---|---|---|
| 2,082,523 | 6/1937 | Segal . |
| 2,269,182 | 1/1942 | Claspy et al. ............ 362/375 |
| 4,201,004 | 5/1980 | Witt . |
| 5,025,355 | 6/1991 | Harwood ................. 362/223 |
| 5,113,328 | 5/1992 | Foster et al. ............. 362/223 |
| 5,124,896 | 6/1992 | Bentley ................... 362/223 |
| 5,150,961 | 9/1992 | Gonzalez . |
| 5,192,125 | 3/1993 | Gonzalez . |
| 5,255,166 | 10/1993 | Gonzalez . |

FOREIGN PATENT DOCUMENTS

| | | | |
|---|---|---|---|
| 291891 | 7/1965 | Netherlands ............ | 362/224 |
| 477650 | 10/1969 | Switzerland ............ | 362/217 |

OTHER PUBLICATIONS

A Two Page Advertisement, "The Next Century's Colorization of Light System", United States Neon Corporation, Los Angeles, CA 90255.

*Primary Examiner*—Ira S. Lazarus
*Assistant Examiner*—Sara Sachie Raab
*Attorney, Agent, or Firm*—Luke J. Wilburn, Jr.

[57] ABSTRACT

A housing assembly for protective support of illuminated glass tubing of the neon tube type comprising a base section, a central section, and a transparent cover section, each having wall portions forming an open sided elongated channel, a support plate mounted in the central section, elongated glass tubing disposed in the cover section and supportably mounted on the support plate in fastening clips, the base, central, and cover sections being formed of resiliently deformable material, such as plastic, and being assembled in snap-fit relation with each other to enclose the open sides of the channels. End caps enclose ends of the cover and central channels and protect the glass tubing and an electrical transformer and wiring disposed therein against weather. The housing assembly may be extrusion molded in varying lengths, and a plurality of assemblies may be connected in a series array and powered from a single low voltage source to provide decoration and lighting to a desired area, such as a building, amusement ride, or the like.

16 Claims, 5 Drawing Sheets

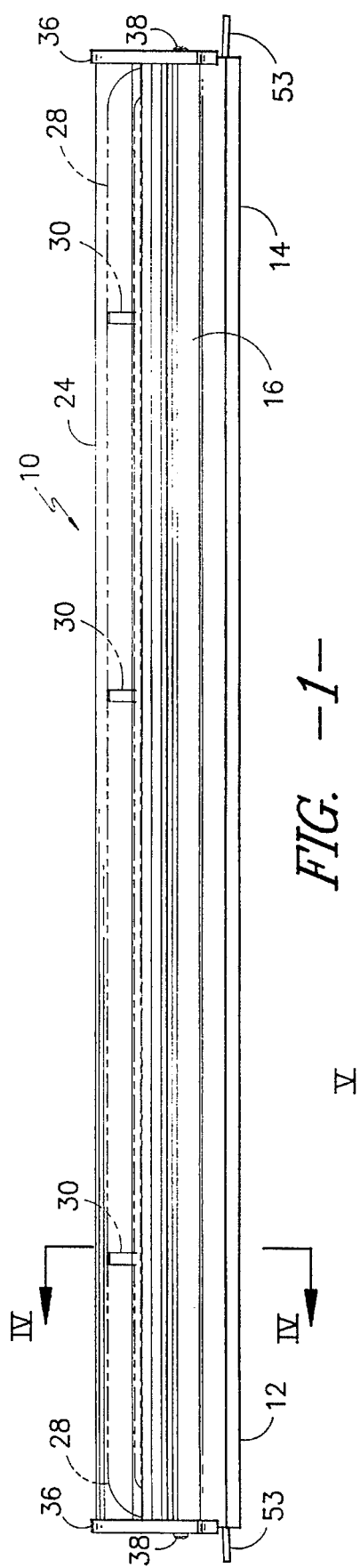
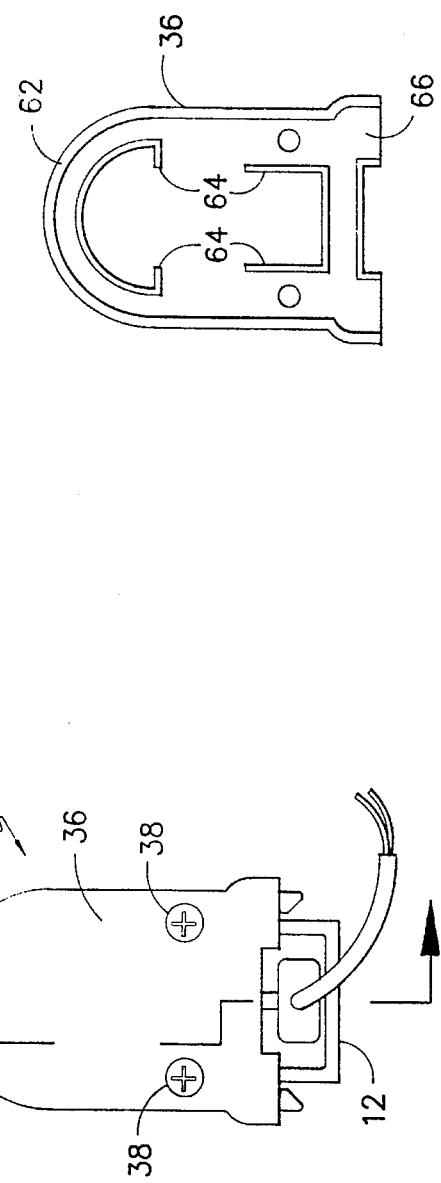

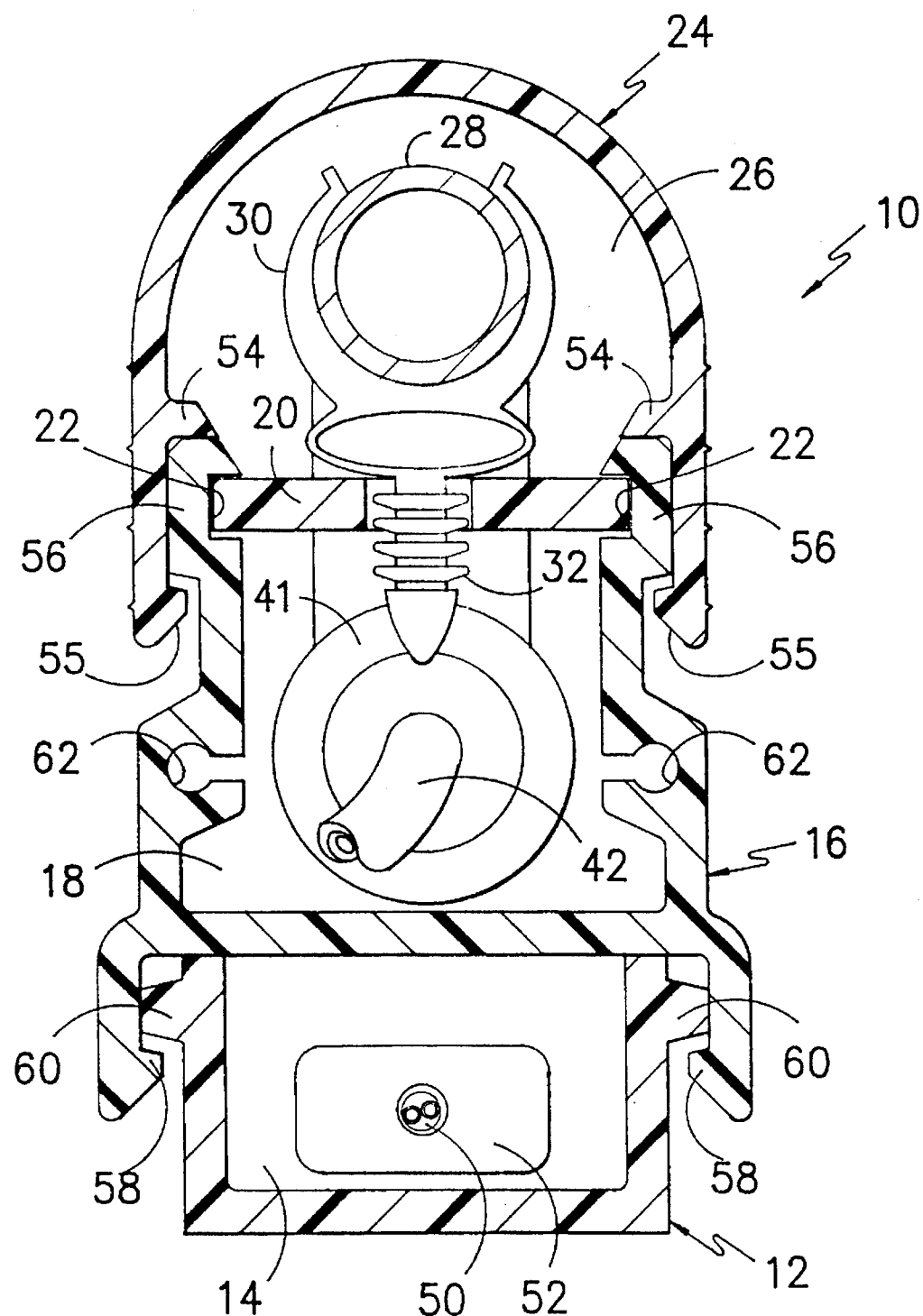
FIG. —4—

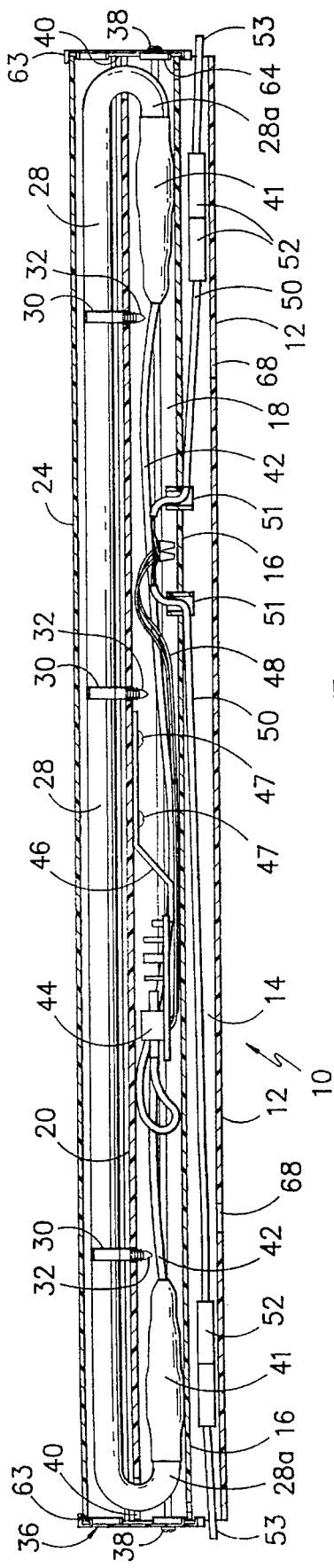
FIG. -5-
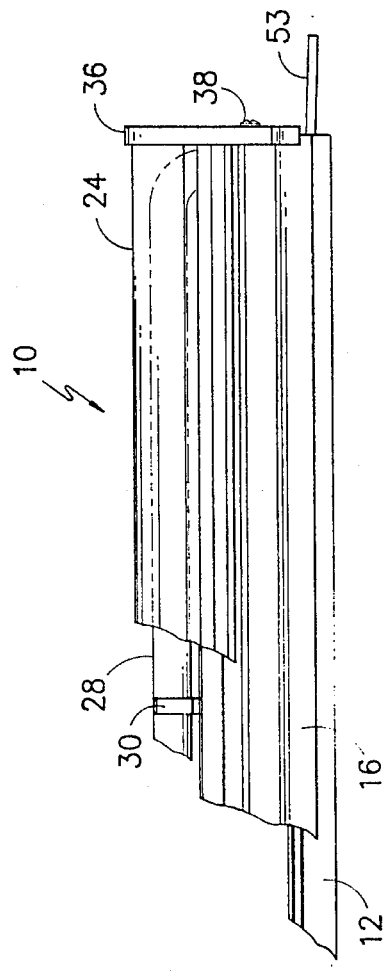
FIG. -6-

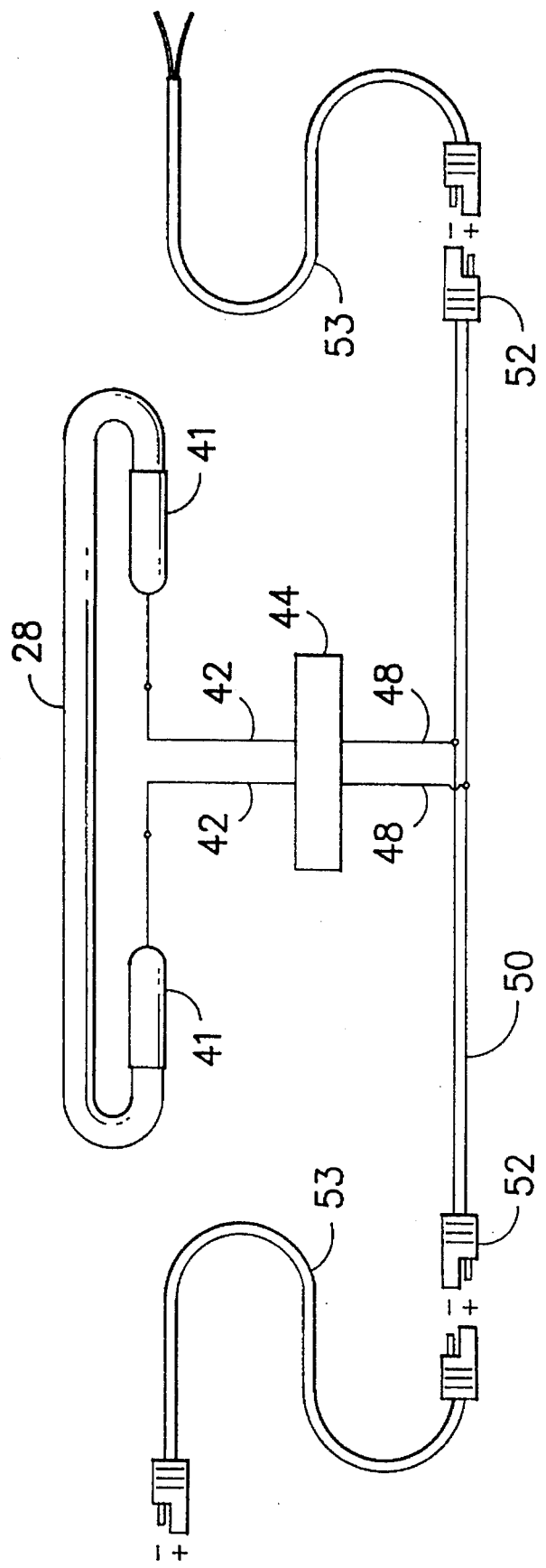
FIG. -7-

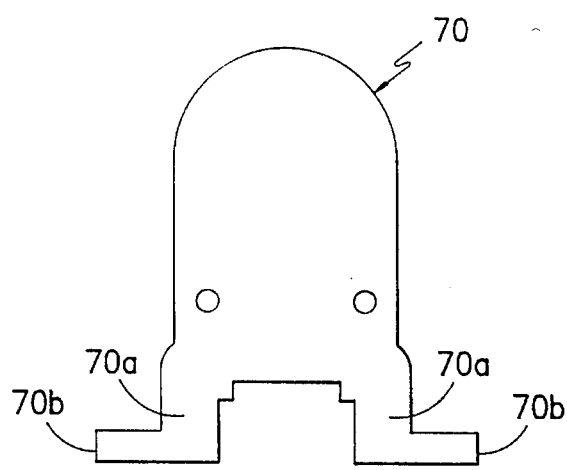
FIG. -8-
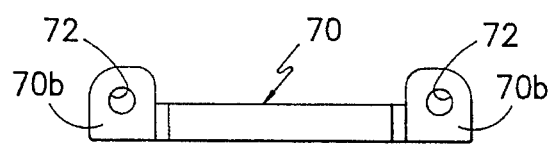
FIG. -9-

HOUSING ASSEMBLY FOR ILLUMINATED GLASS TUBING

This invention relates to a housing assembly for protection and support of illuminated glass tubing of the inert gas-containing tube type and, more particularly, to a housing assembly of simple economical construction for protection and support of glass tubing in both indoor and outdoor environments.

BACKGROUND OF THE INVENTION

Luminous electric lighting of the inert gas-filled tube type have long been employed in commercial and business establishments to provide decoration and illumination. Typically, neon lighting has been used in outdoor environments to outline and highlight various structures, such as buildings, amusement rides, display signs, and the like.

In the use of neon tubing to highlight or outline buildings and other structures in both indoor and outdoor locales, it is desirable to protect the tubing from breakage and to enclose the electrical components thereof from weather and contamination. The present invention is thus directed to a housing assembly for containing and protecting such neon tubing and its associated electrical components and wiring which may be easily attached to support surfaces to provide decoration and illumination.

BRIEF OBJECTS OF THE PRESENT INVENTION

It is an object of the present invention to provide a housing assembly for protective support of illuminated glass tubing which is of simplified and economical construction.

It is another object to provide a housing assembly for illuminated glass tubing which protects the tubing and associated electrical elements under all weather conditions of use.

It is a further object to provide a housing assembly in which the glass tubing lighting elements provide high visibility for illumination of the areas in which the assemblies are employed.

It is further object to provide a unitized modular continuous lighting system with multiple housing assemblies which may be used in various lengths and combinations.

It is another object to provide a housing assembly for protective support of illuminated glass tubing wherein multiple assemblies may be used in combinations without high-voltage wiring exposed therebetween.

It is a further object to provide a housing assembly for protective support of illuminated glass tubing wherein multiple housing assemblies may be employed in series and interconnected with all wiring therebetween contained within the assemblies and protected from weather conditions.

It is still a further object to provide a housing assembly for protective support of illuminated glass tubing wherein the assemblies may be easily and simply installed on a supporting surface by workmen requiring no specialized training.

BRIEF DESCRIPTION OF THE DRAWINGS

FIG. 1 is a side elevation view of a housing assembly for protective support of illuminated glass tubing according with the present invention;

FIG. 2 is an enlarged right end view of the housing assembly of FIG. 1 showing the outside surface of an end cap of the assembly;

FIG. 3 is an elevation view of the inside surface of an end cap of the housing assembly;

FIG. 4 is an enlarged cross-sectional view of the housing assembly of FIG. 1, with left-hand end cap removed, taken generally along line IV—IV of FIG. 1, and looking in the direction of the arrows;

FIG. 5 is a sectional elevation view of the housing assembly of taken generally along the indicated lines V—V of FIG. 2, and looking in the direction of the arrows thereof;

FIG. 6 is an enlarged, broken-away side elevation view of the right-side end portion of the housing of FIG. 1;

FIG. 7 is a wiring diagram of the illuminated glass tubing of the housing assembly, showing schematically the electrical connections and components supplying low voltage power to the illuminated tubing of the housing assembly;

FIG. 8 is an enlarged elevation view of the outside face of a modified form of end cap for the housing assembly of FIG. 1; and FIG. 9 is a top plan view of the modified end cap seen in FIG. 8.

SUMMARY OF THE INVENTION

The invention comprises a multicompartment housing assembly for protective support of illuminated glass tubing of the neon tube type formed of a base section, a central section, and a transparent cover section, each having wall portions forming an open-sided elongated channel. A support plate mounted in the central section has fastening clips which support elongated glass tubing in the cover section for illumination of an area. The base, central, and cover sections are formed of resiliently deformable material, such as extruded plastic, and the sections are assembled in snap-fit relation with each other to enclose the open sides of the respective channels. End caps close ends of the cover and central channels to protect the glass tubing and electrical transformer and wiring means disposed in the cover and central sections against weather. Connecting wiring is located in the base section and a plurality of housing assemblies may be interconnected in series array and powered from a single low voltage power source to provide decoration and lighting to a desired area.

DETAILED DESCRIPTION OF PREFERRED EMBODIMENTS

Referring more particularly to the drawings, the housing assembly 10 for protective support of illuminated glass tubing of the present invention includes a mounting base section 12 having wall portions forming an open-sided elongated channel 14, a central section 16 having wall portions forming an open-sided elongated channel 18, an elongated flat support plate 20 slidably received and supported in opposed elongated grooves 22 located adjacent the open side of central section channel 18, and a cover section 24 having a wall of generally semi-circular shape forming an open-sided elongated channel 26. (note particularly FIG. 4).

The components of the housing assembly 10 preferably are formed of a suitable resiliently deformable material, such as plastic, which are molded into the configurations shown. For economical and simple fabrication, the mounting base section 12, central section 16, and cover section 24 each are of constant cross-sectional shape along their lengths, enabling the formation of the sections in a conventional extrusion molding operation. (See FIG. 4). The plastic material employed for the housing conveniently may be Lexan®. The housing assembly sections may be extruded in varying lengths, as desired, and end caps 36 of rigid plastic are secured to the ends of the housing by screws 38 to close the channels of the central and cover sections, and to protect components therein from elements of weather or other contamination.

The mounting base section 12, central section 16, support plate 20, and end caps 36 are generally opaque, while the cover section 24 is formed transparent or translucent for transmission of light from the illuminated glass tubing 28 from the housing assembly.

Located inside the cover section 24 is elongated glass tubing 28 of the neon-tube type. The tubing 28 is supported in the housing by means of a plurality of tube-engaging clips 30 of resiliently deformable material which are attached to support plate 20 by means of a deformable threaded projection 32 which is frictionally received in and extends through openings 34 in the support plate.

As best seen in FIGS. 4 and 5, the length of glass tubing 28 is supported in snap-fit relation in each of the clips 30 and end portions 28a of the tubing are bent, as in a glass heating operation, to extend downwardly from the cover section channel through openings 40 in support plate 20 into the channel 18 of the central section 16 (FIGS. 4 and 5). The ends of the glass tubing are electrically connected, as by electrodes 41, through transformer output wiring 42 to transformer means 44 which is attached by means of a mounting bracket 46 with fastening screws 47 to the underside of support plate 20 (FIG. 5). The transformer means 44 is in turn connected by means of wiring 48 to a length of jumper wiring 50 located in the mounting base section channel of the housing. One end of the jumper wiring sections 50 extends through small openings in the lower wall of the central section for connection to the wiring 48 and the ends are frictionally secured therein by wire strain relief elements 51. The other ends of the jumper wiring are provided with electrical connection sockets 52 to be attached by additional short lengths of jumper wiring 53 to a power supply and/or jumper wiring in next adjacent housing assemblies of a lighting array.

FIG 7 shows schematically the interconnection of the electrical components of the housing assembly 10 to supply power to the illuminated tubing therein. As illustrated, power may be supplied from a suitable power source such as a low voltage DC power supply (not shown) by way of jumper wiring sections 53, 50 and wiring 48 to conventional transformer means 44 of a type suitable to convert the low voltage DC power source to the high voltage power sufficient to electrify and illuminate the inert gas or gases in the tubing 28. Power is supplied to the gas-filled tubing 28 by way of transformer output wiring 42 and electrodes 41 connected to the ends of the tubing.

Component sections 12, 16, and 24 of the housing assembly are easily assembled and interconnected by frictional engagement of the sections with each other. As best seen in FIGS. 4 and 6, lower side wall portions of cover section 24 of the housing assembly 10 project downwardly and have an upper shoulder 54 and lower protrusion 55 which receive and engage an elongated outer shoulder 56 on the upper wall edges of the central section 16 in snap-fit, frictional relation, such that the open sides of the channels of the cover section 24 and central section 16 are closed from weather and contamination. The channels of the cover section and central section communicate through the openings 40 (FIG. 5) in the ends of support plate 20 through which the tubing 28 passes.

In a similar manner, lower wall portions of central section 16 of the assembly project downwardly and have inward protrusions 58 which receive elongated shoulders 60 on the outer upper wall of mounting base section 12 in snap-fit, frictional engagement to close the open side of the mounting base channel 14. Located in opposed relation on the inner surface of the wall portions of the central section 18 of the housing assembly are passageways, the open ends 62 (FIG. 4) of which receive the threaded screws 38 to secure the end caps of the housing assembly to the ends of the housing sections and seal the ends of the cover section channel and the central channel of the assembly from the weather and contamination.

As best seen in FIG. 3, the inside surface of each of the end caps 36 of the housing assembly has peripheral and internal protruding ribs, as at 63 and 64, which engage the ends of sections 12, 16, and 24 to provide positional support and strength to the cover, central and base support sections of the assembly when the end caps are attached thereto. To further seal the channels of the cover and central sections of the assembly, the inner surface of the end cap may be provided with insulation material, such as a foam rubber pad 66.

As best seen in FIGS. 8 and 9, which depict a modified form of end cap 70 for the housing assembly, the housing assembly may be attached to a suitable support surface by means of the end caps 70 along. As seen, the lower sides 70a of the end caps extend further down to terminate in the same plane as the lower wall of the mounting base section 12 and are provided with protruding shoulder portions 70b having openings 72 therethrough to receive suitable fastening means, such as screws or nails, to attach the end caps directly to a support surface for support of the housing assembly.

from the foregoing description of preferred embodiments of the invention, it can be seen that the housing assembly may be easily supportably attached to and assembled on a supporting surface for use. Utilizing the assembly and end cap construction shown in FIGS. 1, 2, 3, 5, and 6, base support section 12 of the assembly first may be mounted on a receiving support surface by suitable fastening means, such as screws or nails, located in spaced openings 68 (FIG. 5) of the base section. Thereafter, the cover and central sections 24, 16 of the assembly with tubing and wiring may be attached in snap-fit frictional engagement with each other and to the previously mounted base support section 12, with the jumper wiring 50 and 52 supplying low voltage DC power to the transformer and tubing positioned in the channel of the base support section 12. If it is desired to attach the assembly to a support surface by using the modified form of end caps 70, as shown in FIGS. 8 and 9, the base, central, and cover sections and end caps 70 may be pre-assembled before mounting on a support surface, with all circuit and power supply wiring contained and hidden within the assembly housing. Thereafter, one or more housing assemblies are attached to a receiving surface by securing the end caps 70 thereto. End portions of the jumper wiring 50 are attached by either of jumper wiring sections 53 to a power supply line or to the next adjacent jumper wiring in an array of housing assemblies placed in end-to-end relation to establish illumination for a desired distance.

End caps of the housing assembly attached to the ends of the housing effectively seal the cover and central sections of the assembly, while the interconnecting short jumper wiring sections 53 between adjacent assemblies may be pushed into and located within the ends of the base plate channel 12, thus minimizing exposed lengths of wiring between interconnected housing assemblies of an array. By providing a high-voltage step-up transformer 44 in each housing assembly, power may be supplied to an array of assemblies from a single low voltage power source, e.g., 12 volt DC, thereby eliminating high-voltage wiring exposure between assemblies.

If it is desired to program individual housing assemblies of the lighting array in an off-on blinking pattern, power and control wiring from a remote control device may be run in parallel through one or more base plate channel sections of the contiguous assemblies to supply power alternately to individual one or more of the housing assemblies in the array, with power supply lines being contained within and protected by the housing assemblies, thereby substantially eliminating exposed wiring in the array.

The construction arrangement of the component parts of the housing assemblies and their manner of interconnection permit ready disassembly and repair of a housing assembly array in field locations with ready removal and replacement of tubes and transformers of the individual assemblies by workmen needing no specialized or skilled training.

That which is claimed is:

1. A housing assembly for protective support of illuminated glass tubing comprising a base section having wall portions forming an elongated channel having an open side, a central section having wall portions forming an elongated channel having an open side, and a light-transmitting cover section having wall portions forming an elongated channel having an open side, an elongated support plate for glass tubing, said wall portions of said central section including means adjacent the open side of said central section channel for supportably receiving said support plate in the channel, and said wall portions of the base section, central section, and cover section including means for securing the central section to the base section and the cover section to the central section in snap-fit relation to close said open sides of said channels.

2. A housing assembly as defined in claim 1 wherein said channels of said assembly co-extend in a straight-line direction with longitudinal axes of the channels substantially parallel.

3. A housing assembly as defined in claim 2 including end caps fixed to adjacent end portions of said central and cover sections of the assembly to close and seal ends of the channels thereof.

4. A plurality of housing assemblies as defined in claim 3 disposed in end-to-end substantially contiguous straight-line arrangement to defined an array of assemblies, elongated glass tubing in each assembly, means for supportably receiving and positioning the glass tubing to reside within and extend along the channel of said cover section, electrical means disposed in said assembly for supplying power to the glass tubing located in the cover section of the assembly, said electrical means including transformer means and electrical wiring means disposed in each housing assembly for interconnecting the assemblies to an electrical power source, and said wiring means being enclosed within and protected by the housing assemblies from exposure to outside weather conditions.

5. A plurality of assemblies as defined in claim 4 wherein said wiring means includes means disposed within the base sections of the assemblies for conducting power to selected housing assemblies of the array to sequentially illuminate the glass tubing supported therein.

6. A housing assembly as defined in claim 1 including support elements attached to said support plate for supportably receiving and positioning glass tubing to reside within and extend along the channel of said cover section.

7. A housing assembly as defined in claim 6 including elongated glass tubing supported in said support means and disposed in and extending along said cover section channel, and electrical means disposed in said assembly for supplying power to said glass tubing located in the cover section of the assembly.

8. A housing assembly as defined in claim 7 wherein said electrical means in said assembly includes transformer means located in the central section channel of the assembly, and electrical wiring means disposed in said central and base section channels for connecting the transformer means to a power source and to said glass tubing in the cover section channel.

9. A housing assembly as defined in claim 8 wherein said elongated glass tubing supportably positioned in said cover section channel has end portions thereof extending into the central section channel for communication with said electrical wiring means and transformer means.

10. A housing assembly as defined in claim 9 wherein said electrical wiring means includes electrical connector means disposed in said base section channel adjacent each end thereof for interconnecting a plurality of housing assemblies in series to a power source.

11. A housing assembly as defined in claim 1 wherein said means for securing the sections of the assembly in snap-fit relation comprise expanded shoulder means extending along said wall portion of said base and central sections adjacent the open sides of the channels thereof, and projection means adjacent the open side of the top section channel and adjacent the wall portion opposite the open side of the central section for snap-fit frictional engagement and retention on the expanded shoulder means of the central section and base section, respectively.

12. A housing assembly as defined in claim 1 wherein the sections of the housing are formed of a resiliently deformable plastic.

13. A housing assembly as defined in claim 12 wherein the sections are extruded plastic of continuous cross section.

14. A housing assembly as defined in claim 1 wherein the cover section is generally semi-circular in cross section, and glass tubing centrally supported in and extending generally co-extensive with said cover section channel for emitting light from the assembly through the cover section.

15. A housing assembly as defined in claim 1 wherein the base section includes means to facilitate mounting of the base section on a support surface for the housing assembly.

16. A housing assembly as defined in claim 1 including end caps fixed to adjacent end portions of said central and cover sections of the assembly to close and seal ends of the channels thereof, and wherein said end caps includes means thereon to facilitate mounting of the assembly on a support surface therefor.

* * * * *